US012627230B2

(12) United States Patent
Kuo

(10) Patent No.: US 12,627,230 B2
(45) Date of Patent: May 12, 2026

(54) POWER CONVERTER AND POWER CONTROLLER

(71) Applicant: PowerX Semiconductor Corporation, Hsinchu County (TW)

(72) Inventor: Yueh Lung Kuo, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 189 days.

(21) Appl. No.: 18/749,574

(22) Filed: Jun. 20, 2024

(65) Prior Publication Data

US 2025/0219536 A1 Jul. 3, 2025

(30) Foreign Application Priority Data

Dec. 28, 2023 (TW) .................................. 112151456

(51) Int. Cl.
H02M 3/156 (2006.01)
H02M 1/00 (2006.01)
H02M 3/158 (2006.01)
(52) U.S. Cl.
CPC ......... H02M 3/156 (2013.01); H02M 1/0025 (2021.05); H02M 3/1566 (2021.05); H02M 3/158 (2013.01)
(58) Field of Classification Search
CPC ............. H02M 1/0003; H02M 1/0009; H02M 1/0016; H02M 1/0025; H02M 1/0041; H02M 1/08; H02M 3/156; H02M 3/1566; H02M 3/158
See application file for complete search history.

(56) References Cited

U.S. PATENT DOCUMENTS

| | | | |
|---|---|---|---|
| 7,928,715 B2 * | 4/2011 | Shibata ................... | H02M 1/32 323/284 |
| 9,348,345 B2 | 5/2016 | Lynch et al. | |
| 2003/0151933 A1 | 8/2003 | Haraguchi et al. | |

(Continued)

FOREIGN PATENT DOCUMENTS

| | | |
|---|---|---|
| CN | 110572031 B | 1/2022 |
| TW | 201032453 A | 9/2010 |

(Continued)

*Primary Examiner* — Thienvu V Tran
*Assistant Examiner* — Shahzeb K Ahmad
(74) *Attorney, Agent, or Firm* — CKC & Partners Co., LLC

(57) ABSTRACT

A power controller includes a compensation circuit and a control circuit. The compensation circuit is coupled to a power output circuit of a power converter and configured to receive a ramp signal, a voltage feedback signal and a driving feedback signal to generate a control-compensation signal. The driving feedback signal is associated with a phase node voltage at a phase node in the power output circuit. The control circuit is configured to compare the voltage feedback signal with the control-compensation signal to generate a comparison signal. The control circuit is further configured to output a pulse width modulation signal to the power output circuit according to the comparison signal and a clock signal. The pulse width modulation signal has a duty cycle. The control circuit is further configured to set the duty cycle according to the comparison signal and reset the duty cycle according to the clock signal.

20 Claims, 9 Drawing Sheets

100

(56) References Cited

U.S. PATENT DOCUMENTS

| | | | | |
|---|---|---|---|---|
| 2015/0008895 | A1* | 1/2015 | Weng ..................... | H02M 3/156 |
| | | | | 323/285 |
| 2015/0155784 | A1* | 6/2015 | Ouyang .............. | H02M 3/1563 |
| | | | | 323/285 |
| 2015/0311798 | A1* | 10/2015 | Yuan ..................... | H02M 3/156 |
| | | | | 323/288 |
| 2019/0319526 | A1* | 10/2019 | Yang ..................... | H02M 3/155 |
| 2019/0393783 | A1* | 12/2019 | Luo ......................... | H02M 3/15 |
| 2020/0195140 | A1* | 6/2020 | Arbetter ................. | H02M 1/08 |

FOREIGN PATENT DOCUMENTS

| | | |
|---|---|---|
| TW | 1369599 B | 8/2012 |
| TW | M521848 U | 5/2016 |

* cited by examiner

POWER CONVERTER AND POWER CONTROLLER

CROSS-REFERENCE TO RELATED APPLICATION

This application claims priority to Taiwan Application Serial Number 112151456, filed Dec. 28, 2023, which is herein incorporated by reference in its entirety.

BACKGROUND

Technical Field

The present disclosure relates to power control, in particular a power converter and a power controller.

Description of Related Art

A DC-to-DC converter is an electromechanical device for conversion of electric energy, and is configured to convert the voltage of a DC power supply. DC-to-DC converters are extensively applied to low-power devices (e.g., batteries) or high-power devices (e.g., industrial machines). Since the electric power required by the loads of the DC-to-DC converter may vary anytime according to different operation states, it is imperative to ensure the power supply stability of the DC-to-DC converter.

SUMMARY

The present disclosure relates to a power controller applied to a power converter. The power converter comprises a power controller, a power output circuit and an energy storage circuit. The power output circuit is coupled between the power controller and the energy storage circuit and configured to convert an input voltage to an output voltage. The power controller comprises a compensation circuit and a control circuit. The compensation circuit is coupled to the power output circuit and configured to receive a ramp signal, a voltage feedback signal and a driving feedback signal of the power output circuit to generate a control-compensation signal. The voltage feedback signal is generated according to the output voltage, and the driving feedback signal is associated with a phase node voltage at a phase node in the power output circuit. The control circuit is coupled between the compensation circuit and the power output circuit and configured to compare the voltage feedback signal with the control-compensation signal to generate a comparison signal. The control circuit is further configured to output a pulse width modulation signal to a driving circuit according to the comparison signal and a clock signal. The pulse width modulation signal has a duty cycle, and the control circuit is further configured to set the duty cycle according to the comparison signal and reset the duty cycle according to the clock signal.

The present disclosure also relates to a power converter, including a power output circuit, an energy storage circuit, a compensation circuit and a control circuit. The power output circuit comprises a high-side switch, a low-side switch and a driving circuit, and is configured to convert an input voltage to an output voltage. The energy storage circuit is coupled to the power output circuit and configured to receive the output voltage. The compensation circuit is coupled to the power output circuit and configured to receive a ramp signal, a voltage feedback signal and a driving feedback signal of the power output circuit to generate a control-compensation signal. The voltage feedback signal is generated according to the output voltage, and the driving feedback signal is associated with a phase node voltage at a phase node in the power output circuit. The control circuit is coupled between the compensation circuit and the power output circuit and configured to compare the voltage feedback signal with the control-compensation signal to generate a comparison signal. The control circuit is further configured to output a pulse width modulation signal to a driving circuit according to the comparison signal and a clock signal. The pulse width modulation signal has a duty cycle, and the control circuit is further configured to set the duty cycle according to the comparison signal and reset the duty cycle according to the clock signal.

Therefore, by taking the "driving feedback signal associated with the phase node voltage" as the control-compensation signal and generating the control-compensation signal by means of negative feedback, the power converter will be able to adjust the duty cycle of the pulse width modulation signal according to the load conditions, thereby improving the power supply stability. Meanwhile, the application bandwidth and transient response of the power converter can also be improved.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
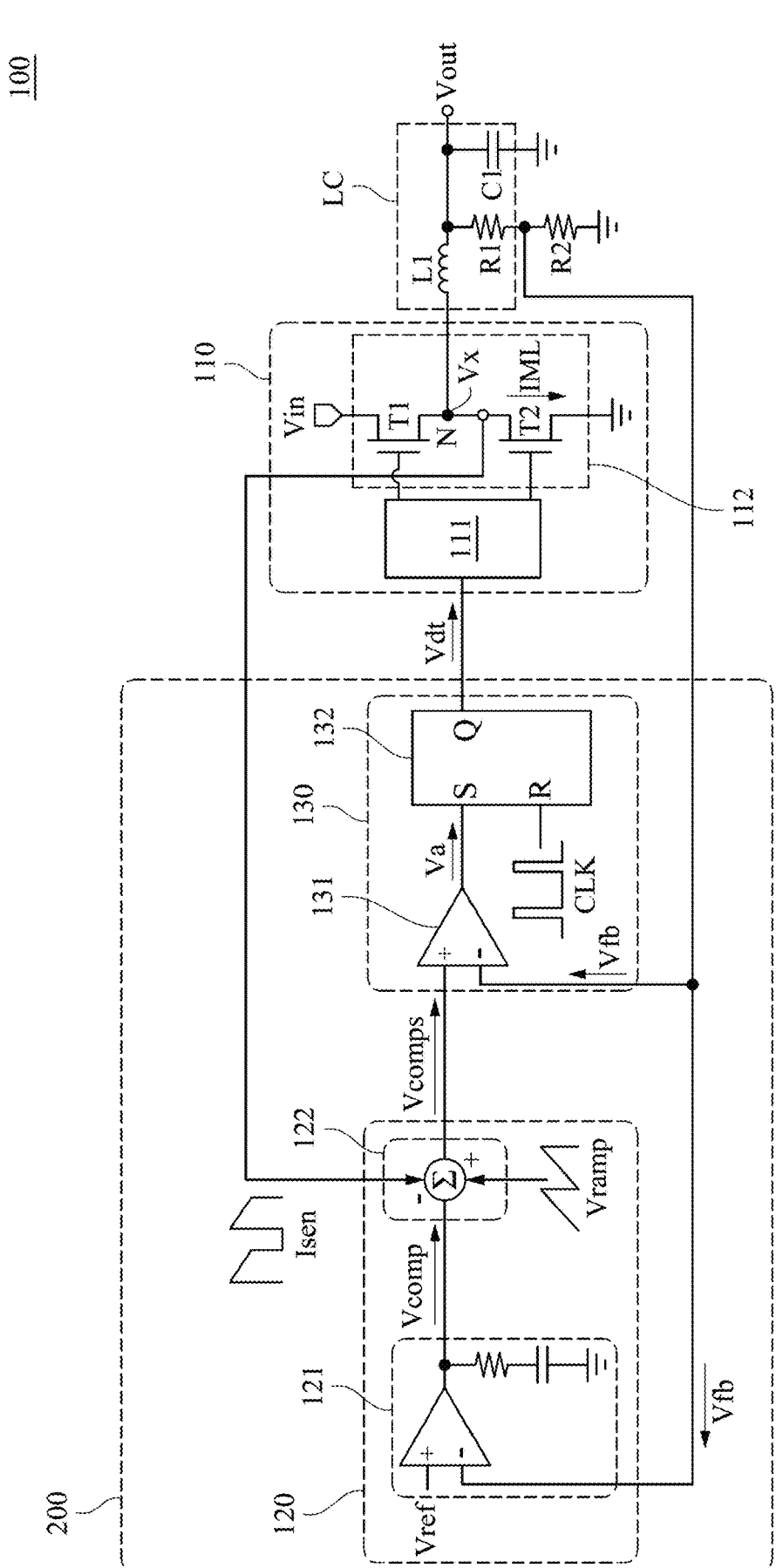
FIG. 1A is a schematic diagram of a power converter according to some embodiments of the present disclosure.

The following will disclose a plurality of embodiments of the present invention by means of drawings. For the sake of clarity, many practical details will be explained in the following description. However, it should be understood that these practical details should not be used to limit the present invention. That is, in some embodiments of the present invention, these practical details are not necessary. In addition, to simplify the drawings, some known, commonly used structures and elements are denoted briefly in the drawings.

Herein, when an element is "connected" or "coupled", it may mean "electrically connected" or "electrically coupled". The term "connected" or "coupled" may also indicate collaboration or interaction between two or more elements. In addition, although the terms such as "first", "second" are used herein to describe different elements, they are merely used to distinguish the elements or operations described with the same technical term. Unless clearly specified in the context, the terms neither specifically refer to or imply an order or sequence, nor are used to limit the present invention.

FIG. 1A is a schematic diagram of a power converter 100 according to an embodiment of the present disclosure. In the embodiment of FIG. 1A, the power converter 100 is implemented as a DC-to-DC converter. The power converter 100 comprises a power output circuit 110, a power controller 200 and an energy storage circuit LC. The power output circuit 110 comprises a driving circuit 111 and a switching circuit 112. The power controller 200 comprises a compensation circuit 120 and a control circuit 130. The switching circuit 112 is configured to receive an input voltage Vin and receive a control signal provided by the driving circuit 111. In addition, the energy storage circuit LC comprises an inductor L1 and a capacitor C1.

The power output circuit 110 is coupled between the power controller 200 and the energy storage circuit LC. The power output circuit 110 is configured to selectively (e.g., alternately) turn on or turn off each of a high-side switch T1 and a low-side switch T2 according to the control signal to convert the input voltage Vin into an output voltage Vout, and further output the output voltage Vout to the energy storage circuit LC. Meanwhile, the power output circuit 110 further generates a voltage feedback signal Vfb through a plurality of resistors R1 and R2. In one embodiment, the voltage feedback signal Vfb can be a divided voltage of the output voltage Vout.

In one embodiment, the high-side switch T1 and the low-side switch T2 are coupled to the control circuit 130 through the driving circuit 111. There is a phase voltage node (e.g., a phase node N denoted in FIG. 1A) between the high-side switch T1 and the low-side switch T2. One terminal of the inductor L1 is coupled to the phase node N, while the other terminal is configured to generate the output voltage Vout by the output capacitor C1. Since those skilled in the art can understand the operation of the power output circuit 110, further description is omitted here. In addition, in one embodiment, the power converter 100 can be implemented as one converting circuit in a multi-phase power converter to output single-phase current.

Referring to FIG. 1A, the compensation circuit 120 generates a driving feedback signal Isen according to a low-side current IML (i.e., the current flowing through the low-side switch T2). The driving feedback signal Isen is associated with a phase node voltage Vx at a phase node N. In this embodiment, the driving feedback signal Isen is a driving current signal which is generated according to the low-side current IML (e.g., the current flowing through the low-side switch T2) for providing information about the low-side current.

The compensation circuit 120 is coupled to receive a ramp signal Vramp, the voltage feedback signal Vfb and the driving feedback signal Isen. The compensation circuit 120 generates a control-compensation signal Vcomps according to the error signal Vcomp, the ramp signal Vramp and the driving feedback signal Isen.

In one embodiment, the compensation circuit 120 comprises an error detection circuit 121 and an operational circuit 122. The error detection circuit 121 is coupled to the resistors R1 and R2. The input terminals of the error detection circuit 121 are configured to receive a voltage reference signal Vref (e.g., a fixed bias voltage signal) and the voltage feedback signal Vfb. The error detection circuit 121 is configured to generate an error signal Vcomp according to the voltage feedback signal Vfb and the voltage reference signal Vref, which allows the compensation circuit 120 to generate a control-compensation signal Vcomps. In one embodiment, the error detection circuit 121 comprises a comparator configured to generate the error signal Vcomp according to the difference between the voltage reference signal Vref and the voltage feedback signal Vfb. For example, when the voltage reference signal Vref is greater than the voltage feedback signal Vfb, the error signal Vcomp is at a high level; when the voltage reference signal Vref is less than the voltage feedback signal Vfb, the error signal Vcomp is at a low level.

The operational circuit 122 is coupled between the error detection circuit 121 and the control circuit 130. The operational circuit 122 receives the error signal Vcomp, the ramp signal Vramp and the driving feedback signal Isen. The operational circuit 122 is configured to generate the control-compensation signal Vcomps according to the error signal Vcomp, the ramp signal Vramp and the driving feedback signal Isen. The ramp signal Vramp can be a sawtooth wave with a fixed slope. The "sawtooth wave" here means a kind of wave that changes (e.g., rise or fall) from a fixed level in each signal cycle and returns to the same fixed level at the end of the signal cycle before entering the next signal cycle. The positive slope of the ramp signal Vramp in a signal cycle indicates that the level of the ramp signal Vramp is rising gradually. In addition, the present disclosure does not limit the ramp signal to be sawtooth only. Based on the pattern of the slopes, the ramp signal Vramp may also be a triangular wave.

In one embodiment, the driving feedback signal Isen is fed back to the operational circuit 122, and the control-compensation signal Vcomps is obtained by adding the ramp signal Vramp to the error signal Vcomp and then subtracting the driving feedback signal Isen from the sum of the ramp signal Vramp and the error signal Vcomp. The above operation performed by the operational circuit 122 is given as an example. In other embodiments, the operational circuit 122 can combine the control-compensation signal Vcomps, the ramp signal Vramp, and the driving feedback signal Isen by performing another operation on them for obtaining the control-compensation signal Vcomps.

The control circuit 130 is coupled between the compensation circuit 120 (the operational circuit 122) and the power output circuit 110 and configured to compare the voltage feedback signal Vfb with the control-compensation signal Vcomps to generate a comparison signal Va. The control circuit 130 is further configured to generate a pulse width modulation signal Vdt according to the comparison signal Va and a clock signal CLK and to output the pulse width modulation signal Vdt to the driving circuit 111. The driving circuit 111 generates the control signal according to a duty cycle (also known as duty ratio) of the pulse width modulation signal Vdt, and selectively turns on or turns off each of the high-side switch T1 and the low-side switch T2. The driving feedback signal Isen can be seen as a half-cycle current signal, and the waveform thereof is shown in FIG. 1A. For example, in a positive half cycle of the pulse width modulation signal Vdt, the high-side switch T1 is turned on, and the low-side switch T2 is turned off. In this moment, the input voltage Vin charges the capacitor C1, and a current flows from the phase node N to the capacitor C1, which causes the driving feedback signal Isen to be zero. In a negative half cycle of the pulse width modulation signal Vdt, the high-side switch T1 is turned off, and the low-side switch T2 is turned on. In this moment, the energy stored in the inductor L1 is released through the low-side switch T2. According to the characteristics of inductor Volt-Second balance, when the input voltage Vin no longer charges the inductor L1 and the capacitor C1 through the high-side switch T1, the inductor L1 tends to continuously supply the inductor current in previous current direction. As a result, the current of the low-side switch T2 (i.e., low-side current IML) will flow from a ground terminal to the phase node N, and the higher the current flowing through the low-side switch T2, the greater the driving feedback signal Isen.

The control circuit 130 is configured to set the duty cycle of the pulse width modulation signal Vdt (i.e., to switch the pulse width modulation signal Vdt to an enabling level) according to the comparison signal Va, and to reset the duty cycle of the pulse width modulation signal Vdt (i.e., to switch the pulse width modulation signal Vdt to a disabling level) according to the clock signal CLK. In one embodiment, the control circuit 130 generates the pulse width modulation signal Vdt by taking a leading-edge of each pulse of the clock signal CLK as a judgment condition. When the comparison signal Va changes (i.e., the voltage feedback signal Vfb intersects with the control-compensation signal Vcomps), the control circuit 130 sets the pulse width modulation signal Vdt to the enabling level, and when a clock cycle of the clock signal CLK is generated, the pulse width modulation signal Vdt is reset to the disabling level.

In one embodiment, the control circuit 130 comprises a signal comparator 131 and a signal register 132. The signal comparator 131 has a first input terminal (e.g., non-inverting input terminal) and a second input terminal (e.g., inverting input terminal). The first input terminal is configured to receive the control-compensation signal Vcomps, and the second input terminal is configured to receive the voltage feedback signal Vfb. The comparison signal Va is generated according to a difference between the control-compensation signal Vcomps and the voltage feedback signal Vfb. For example, when the control-compensation signal Vcomps is greater than the voltage feedback signal Vfb, the comparison signal Va is at a high level; when the control-compensation signal Vcomps is less than the voltage feedback signal Vfb, the comparison signal Va is at a low level. The signal register 132 is coupled between the signal comparator 131 and the power output circuit 110. An input terminal of the signal register 132 is configured to receive the comparison signal Va, and the signal register 132 is configured to output the pulse width modulation signal Vdt according to the clock signal CLK. In one embodiment, the signal register 132 can be an SR flip-flop, and the S terminal of the SR flip-flop is configured to receive the comparison signal Va.

According to the present disclosure, the driving feedback signal Isen associated with the phase node N in the power output circuit 110 is used as a control-compensation signal, and the control-compensation signal Vcomps is generated by means of negative feedback (i.e., subtracting the driving feedback signal Isen). Accordingly, the power converter 100/power controller 200 can adjust the duty cycle of the pulse width modulation signal Vdt in advance according to the load conditions, to ensure timely supply of electrical energy corresponding to the load conditions, thereby improving the power supply stability of the power converter 100. Moreover, using the driving feedback signal Isen for compensation, an application bandwidth of the power converter 100 can be increased and a transient response of signals can be improved.

For example, when the power converter 100 is overloaded (i.e., the load at the output terminal needs more power), the duty cycle of the pulse width modulation signal Vdt is extended accordingly to increase the output current of the power converter 100. In view of this, the present disclosure generates and provides the control-compensation signal Vcomps to one input terminal of the signal comparator 131 by feeding back the driving feedback signal Isen associated with the phase node N, so as to promptly feedback current load conditions of the power converter 100 for adjusting the pulse width modulation signal Vdt, thereby outputting better and accurate transient response.

Figure 1B:
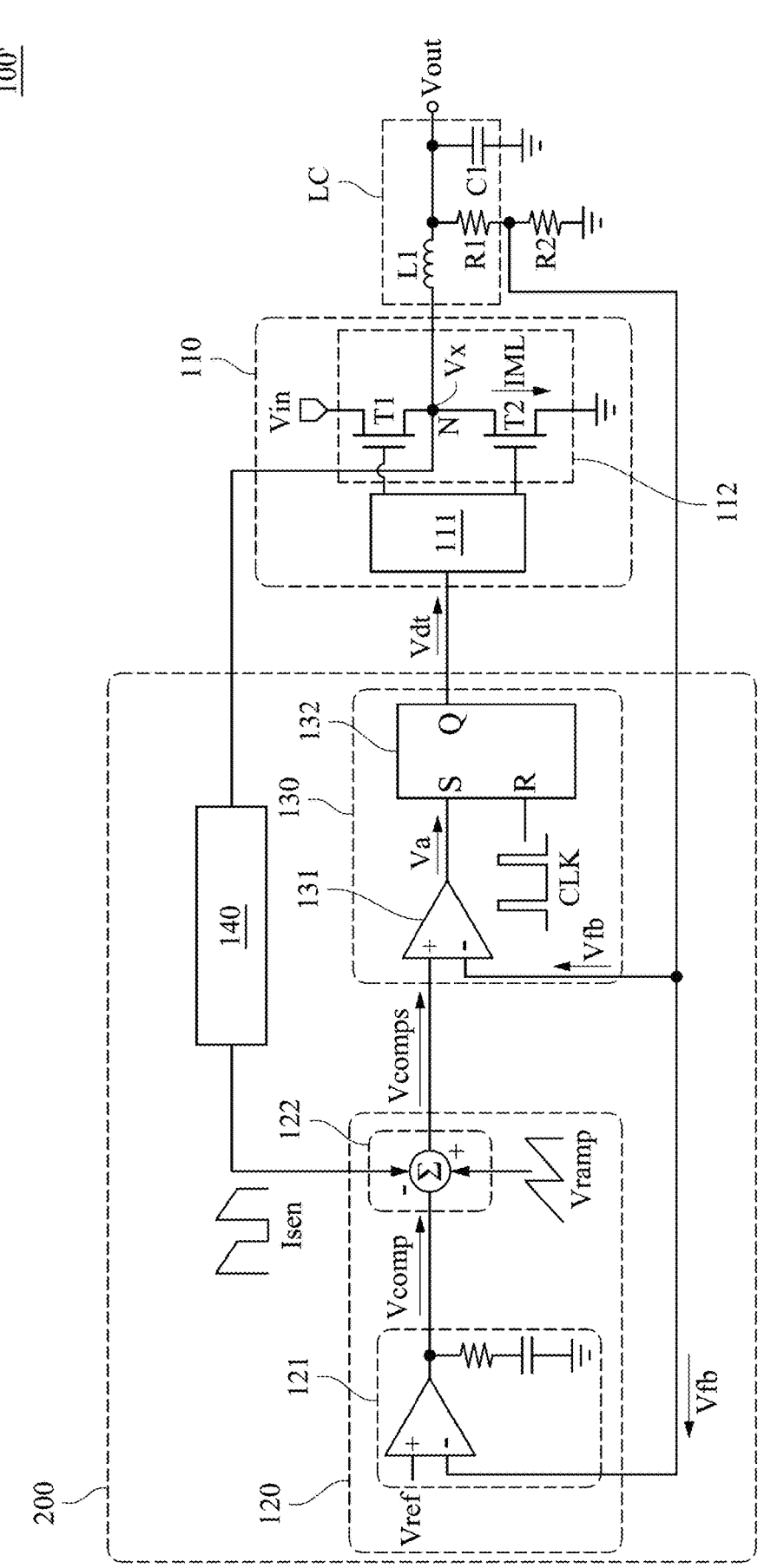
FIG. 1B is a schematic diagram of a power converter according to another embodiment of the present disclosure.

Referring to FIG. 1B, FIG. 1B is a schematic diagram illustrating a variant example corresponding to the power converter 100 in FIG. 1A. As shown in FIG. 1B, a power converter 100' further comprises a feedback circuit 140, and the power output circuit 110 generates the driving feedback signal Isen by the feedback circuit 140. The feedback circuit 140 is coupled between the phase node N of the power output circuit 110 and the compensation circuit 120, and configured to generate a driving current signal according to the phase node voltage Vx at the phase node N as the driving feedback signal Isen. The feedback circuit 140 can convert a voltage to a current, a current to another current, or a current to a voltage, and the output of the feedback circuit 140 can be used for generating the control-compensation signal Vcomps in FIG. 1B through combination with other signals. The similar elements associated with the embodiment illustrated in FIG. 1A are denoted by the same reference symbol to facilitate understanding, and the detailed operations of the similar elements are already elaborated in previous paragraphs and thus not further described here, unless some elements are otherwise in collaboration with corresponding elements in FIG. 1B.

Figure 1C:
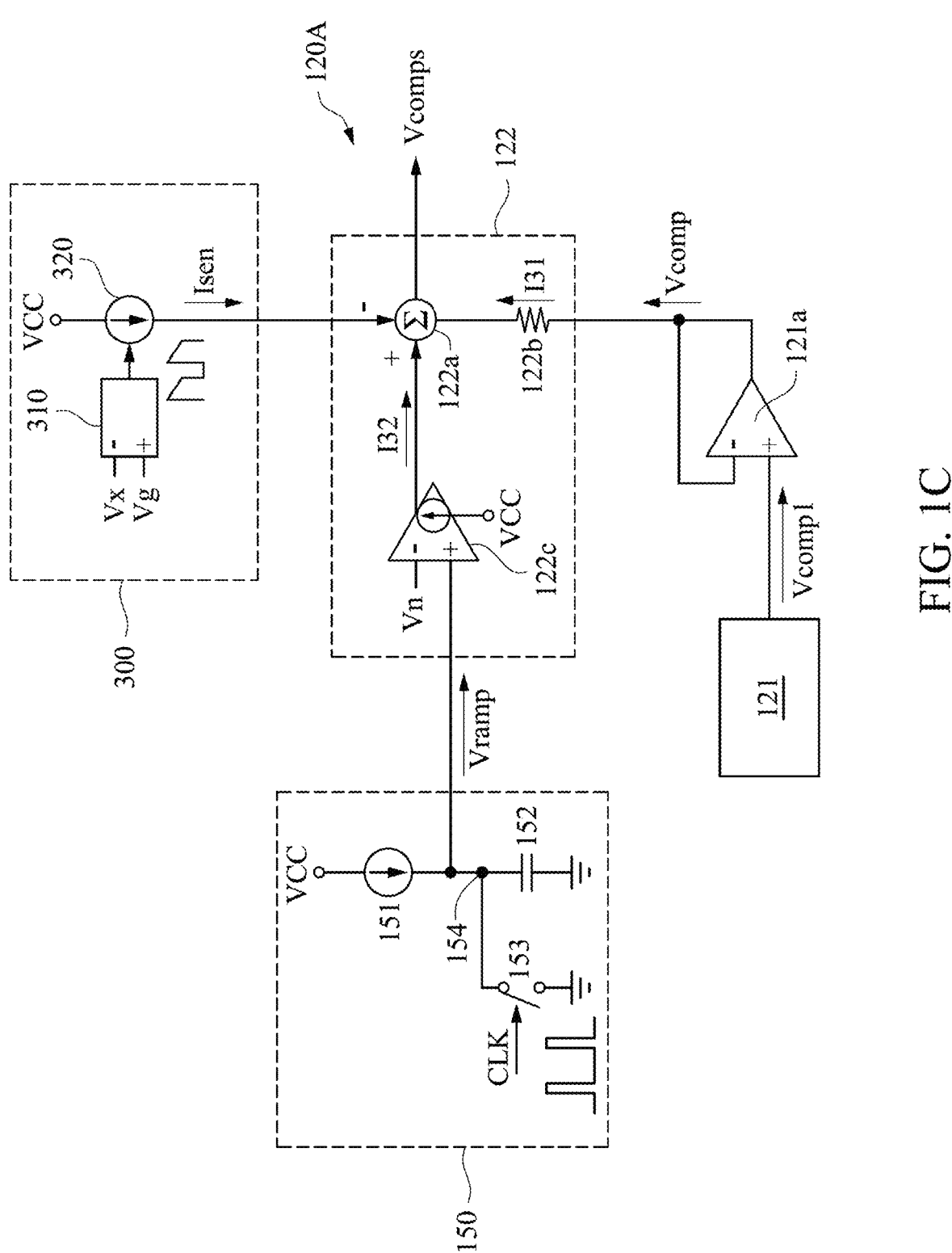
FIG. 1C is a schematic diagram of a feedback circuit and a compensation circuit according to some embodiments of the present disclosure.

FIG. 1C is a schematic diagram illustrating a feedback circuit 300 and a compensation circuit 120A according to an embodiment of the present disclosure, where the feedback circuit 300 can be an example of the feedback circuit 140 in FIG. 1B, and the compensation circuit 120A can be an example of the compensation circuit 120 in FIG. 1B. As shown in FIG. 1C, the compensation circuit 120A comprises the error detection circuit 121 and the operational circuit 122, and the error detection circuit 121 provides the error signal Vcomp to the operational circuit 122 through a buffer 121a. The buffer 121a comprises an operational amplifier for receiving negative feedback, and is configured to generate the error signal Vcomp substantially identical to an error signal Vcomp1 according to the error signal Vcomp1 output by the error detection circuit 121, so that the error signal Vcomp1 is not affected by the driving feedback signal Isen thereby realizing an effect of signal isolation. In addition, an accumulator 122a adds a current I32 generated from the ramp signal Vramp by a transduction amplifier 122c to a current I31 generated from the error signal Vcomp by a resistor 122b. Then, the accumulator 122a subtracts the driving feedback signal Isen from the sum of the currents I32 and I31 to generate the control-compensation signal Vcomps. The transduction amplifier 122c is coupled to a voltage VCC.

Moreover, the compensation circuit 120A further obtains the ramp signal Vramp through a signal generating circuit 150. The signal generating circuit 150 comprises a current source 151, a capacitor 152 and a switch 153. The signal generating circuit 150 is configured to generate the ramp signal Vramp according to the clock signal CLK. The current source 151 is coupled to the voltage VCC. Specifically, the signal generating circuit 150 controls the turned-on/turned-off state of the switch 153 according to the clock signal CLK, so as to control the time of charging the capacitor 152 by the current source 151.

Specifically, in the positive half cycle, the clock signal CLK turns off the switch 153, and then the current source 151 charges the capacitor 152, so that the voltage at a node

154 coupled to the capacitor 152 rises, and the ramp signal Vramp is in a positive slope. In the negative half cycle, the clock signal CLK turns on the switch 153, and then the capacitor 152 is discharged through the ground terminal, so that the voltage at the node 154 coupled to the capacitor 152 drops, and the ramp signal Vramp is in a negative slope. As those skilled in the art can understand many ways or practices of generating the ramp signal Vramp, the details thereof are omitted here, and the signal generating circuit 150 of the present disclosure is also not limited to the depiction in FIG. 1C.

In this embodiment, the feedback circuit 300 is a transduction amplifier. The feedback circuit 300 comprises a comparison circuit 310 and a current source 320. The current source 320 is coupled to the voltage VCC. The comparison circuit 310 generates a driving voltage signal according to a difference between the phase node voltage Vx and a ground voltage Vg. For example, when the ground voltage Vg is greater than the phase node voltage Vx, the comparison circuit 310 outputs a high-level signal; when the ground voltage Vg is less than the phase node voltage Vx, the comparison circuit 310 outputs a low-level signal. The driving voltage signal equivalently providing information about low-side current. The current source 320 is coupled to the comparison circuit 310 to generate a driving current signal according to the received driving voltage signal, and the generated driving current signal is used as the driving feedback signal Isen.

Referring to FIG. 1B and FIG. 1C, in one embodiment, the feedback circuit 140/300 is coupled to the phase node N the feedback circuit 140/300 processes the phase node voltage Vx and the ground voltage Vg (for example, through subtraction) to simulate the information of the low-side current (i.e., the current flowing through the low-side switch), and thus the generated driving feedback signal Isen contains the information of the low-side current. Therefore, the driving feedback signal Isen generated by the feedback circuit 140 corresponds to a driving current signal of the current (i.e., a half-cycle signal of the output current of a power converter 100') of the low-side switch T2. Similarly, the driving feedback signal Isen can be regarded as a half-cycle current signal with a waveform shown in FIG. 1B or FIG. 1C.

For example, in the positive half cycle of the pulse width modulation signal Vdt, the high-side switch T1 is turned on and the low-side switch T2 is turned off, and then the input voltage Vin charges the inductor L1 and the capacitor C1 through the high-side switch T1. At this time, the phase node voltage Vx is not equal to zero, and the pulse output by the comparison circuit 310 is of a sawtooth shape.

On the other hand, in the negative half cycle of the pulse width modulation signal Vdt, the high-side switch T1 is turned off and the low-side switch T2 is turned on, and then the energy stored in the inductor L1 is released through the low-side switch T2. According to the characteristics of inductor Volt-Second balance, when the input voltage Vin no longer charges the inductor L1 and the capacitor C1 through the high-side switch T1, the current direction of the inductor L1 tends to maintain the previous direction, and thus, the inductor L1 continuously supply the inductor current. As a result, the current of the low-side switch T2 flows from the ground terminal to the phase node N, and thus, the phase node voltage Vx is negative. As shown in FIG. 1C, the change in the voltage level of the phase node voltage Vx affects the output of the comparison circuit 310, thereby adjusting the magnitude of the current of the current source 320. For example, when the current flowing through the low-side switch T2 is greater, the phase node voltage Vx is not only lower than the ground voltage Vg, but also becomes more negative such that the change in voltage difference between the phase node voltage Vx and the ground voltage Vg becomes greater, thereby leading to a greater driving feedback signal Isen generated by the current source 320. That is, the difference between the "phase node voltage Vx and ground voltage Vg" detected by the comparison circuit 310 can be used to adjust the magnitude of the driving feedback signal Isen generated by the current source 320.

Figure 2A:
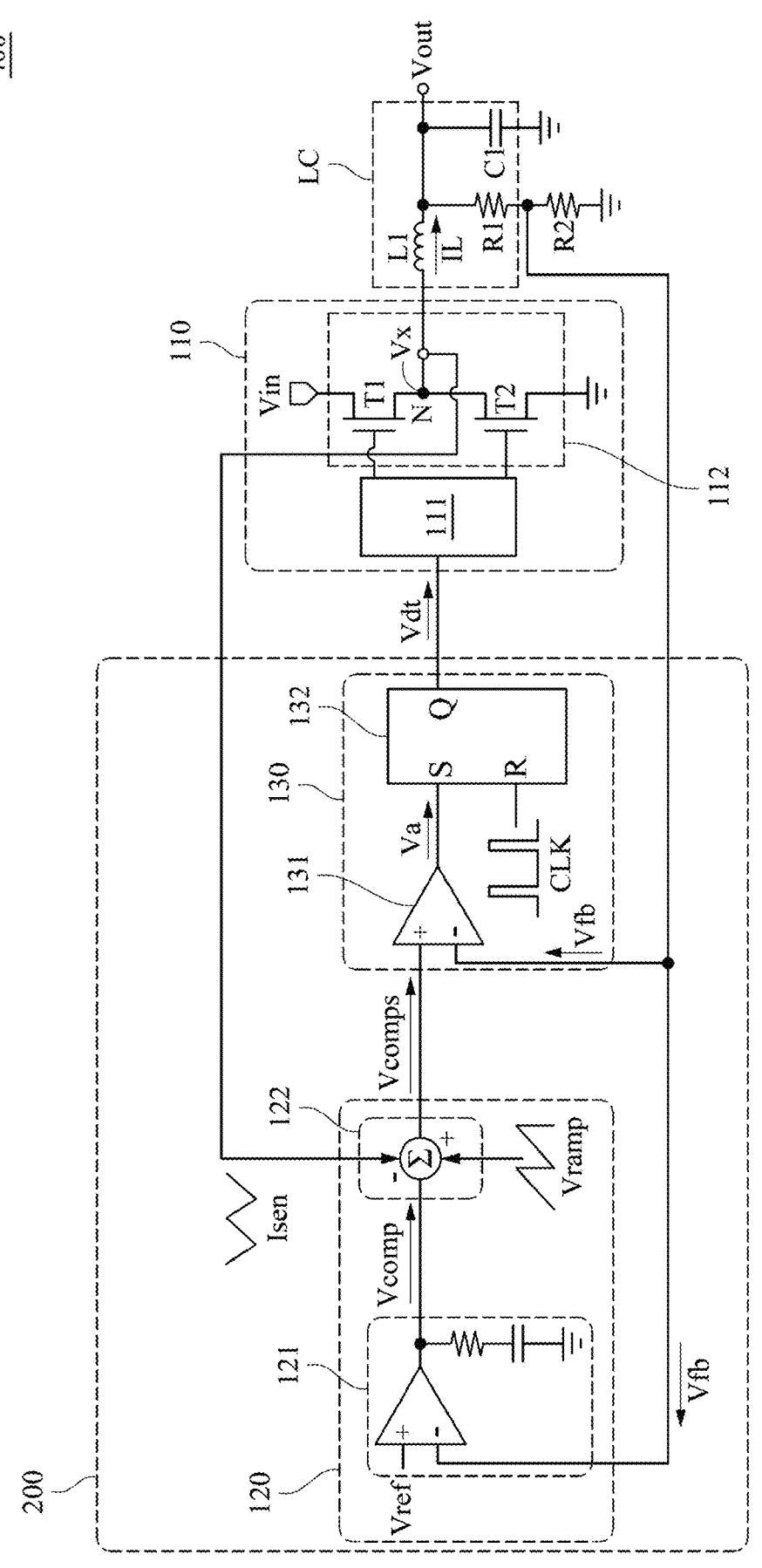
FIG. 2A is a schematic diagram of a power converter according to some embodiments of the present disclosure.

FIG. 2A is a schematic diagram of a power converter 400 according to another embodiment of the present disclosure. In FIG. 2A, the similar elements associated with the embodiment illustrated in FIG. 1A are denoted by the same reference symbol to facilitate understanding, and detailed operations of the similar elements are already elaborated in previous paragraphs and thus are not further described here. The power converter 400 in FIG. 2A differs from the power converter 100 in FIG. 1A in that the compensation circuit 120 generates the control-compensation signal Vcomps according to the information of the inductor current (i.e., the current flowing through the inductor L1) rather than the information of the low-side current. Therefore, the power converter 400 will be able to adjust the duty cycle of the pulse width modulation signal Vdt in advance according to the load conditions, to improve the power supply stability of the power converter 100 and the transient response of signals.

Figure 2B:
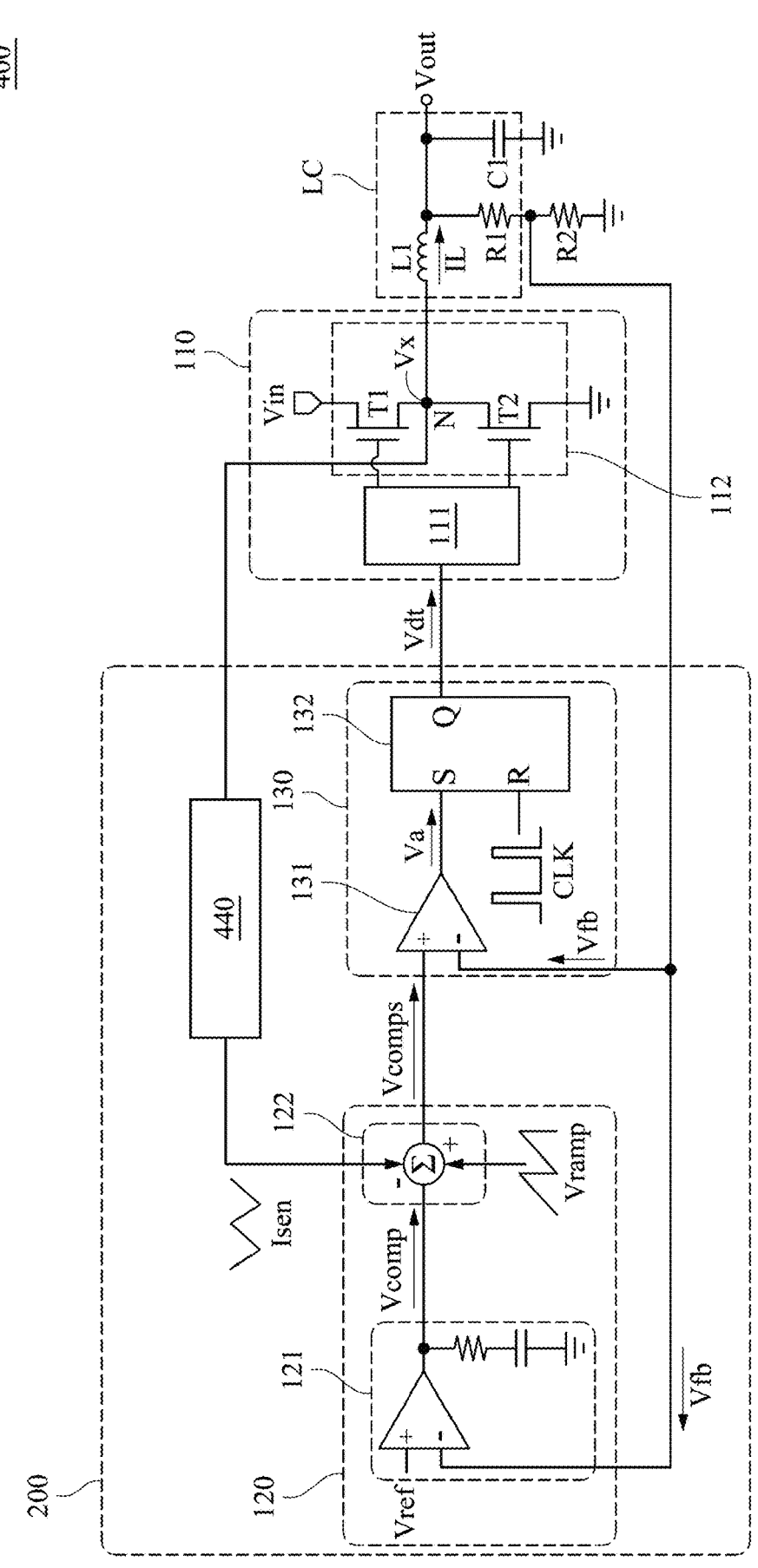
FIG. 2B is a schematic diagram of a power converter according to another embodiment of the present disclosure.

Referring to FIG. 2B, FIG. 2B is a schematic diagram illustrating a variant example corresponding to the power converter 400 in FIG. 2A. In FIG. 2B, the similar elements associated with the embodiment illustrated in FIG. 2A are denoted by the same reference symbol to facilitate understanding, and the detailed operations of the similar elements are already elaborated in previous paragraphs and thus are not further described here, unless the elements are in collaboration with corresponding elements in FIG. 2B and need description. As shown in FIG. 2B, a power converter 400' further comprises a feedback circuit 440, and the power output circuit 110 generates the driving feedback signal Isen through the feedback circuit 440. The feedback circuit 440 is coupled between the power output circuit 110 and the compensation circuit 120 and configured to generate a driving current signal according to the phase node voltage Vx at the phase node N as the driving feedback signal Isen.

As shown in FIGS. 1A, 1B, 2A and 2B, in the circuit architecture of the present disclosure, the non-inverting input terminal of the signal comparator 131 is configured to receive the control-compensation signal Vcomps, and the control-compensation signal Vcomps is based on the error signal Vcomp and the ramp signal Vramp" and serves as a compensation by further introducing "the current information of the power output circuit 110 (e.g., the low-side current or the inductor current)". The inverting input terminal of the signal comparator 131 receives the voltage feedback signal Vfb. The signal comparator 131 compares the signals received respectively by the non-inverting input terminal and the inverting input terminal to promptly adjust the duty cycle of the pulse width modulation signal. Therefore, the power converter can realize faster transient response and improve the control stability. The present disclosure provides a novel circuit architecture for a power converter which realizes faster control than the fixed-frequency control approaches or constant-on-time approaches. When the control-compensation signal Vcomps is pulled up quickly and the voltage feedback signal Vfb falls, the intersection of the control-compensation signal Vcomps and the voltage feedback signal Vfb will appear much earlier due to the fast transient response, to realize an effect of generating a duty cycle in advance.

In addition, under the situation where the output current of the power converter is too great and the control-compensation signal Vcomps falls accordingly, the present disclosure can also timely shorten the duty cycle. Appropriate adjustment in the transduction amplification rate of the low-side circuit can prevent the capacitor C1 in the energy storage circuit LC from being overcharged, thereby improving the system stability.

Figure 2C:
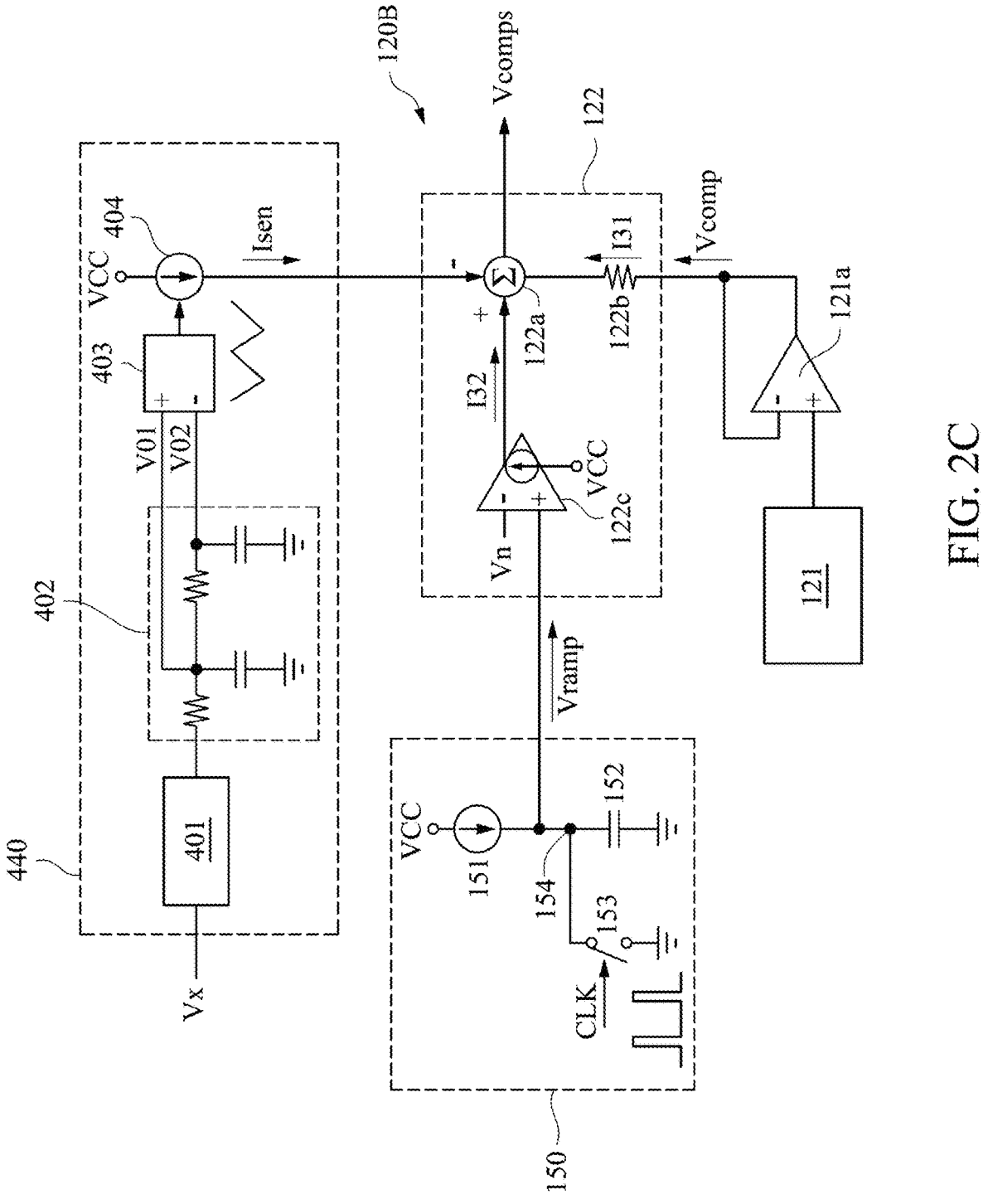
FIG. 2C is a schematic diagram of a feedback circuit and a compensation circuit according to some embodiments of the present disclosure.

FIG. 2C is a schematic diagram of a feedback circuit 440 and a compensation circuit 120B according to another embodiment of the present disclosure. The compensation circuit 120B may be the same as the compensation circuit 120A in FIG. 1C. As shown in FIG. 2C, in this embodiment, the feedback circuit 440 comprises a scale circuit 401, a filter circuit 402, a comparison circuit 403 and a current source 404, wherein the comparison circuit 403 and the current source 404 can be jointly seen as a transduction amplifying circuit. The current source 404 is coupled to a voltage VCC. The scale circuit 401 is coupled to the phase node N of the power output circuit 110 to receive the phase node voltage Vx. In one embodiment, the scale circuit 401 is configured to perform voltage reduction on the phase node voltage Vx, and input the adjusted phase node voltage Vx to the filter circuit 402. In some embodiments, the scale circuit 401 can be omitted.

The filter circuit 402 is coupled to the scale circuit 401 and configured to generate a plurality of filter signals according to the adjusted phase node voltage Vx. As shown in FIG. 2C, in one embodiment, the filter circuit 402 is a second-order filter which is configured to generate a first-order filter signal V01 and a second-order filter signal V02 according to the phase node voltage Vx. Through a filtering process, the first-order filter signal V01 comprises a DC signal component and an AC signal component in the phase node voltage Vx, and the second-order filter signal V02 only comprises the DC signal component in the phase node voltage Vx.

The comparison circuit 403 is coupled to the filter circuit 402 and configured to generate a driving voltage signal according to the filter signals, and the driving voltage signal is provided to generate the driving feedback signal Isen. For example, a non-inverting input terminal of the comparison circuit 403 is configured to receive the first-order filter signal V01, and an inverting input terminal of the comparison circuit 403 is configured to receive the second-order filter signal V02. The comparison circuit 403 is generate a driving voltage signal by comparing the first-order filter signal V01 with the second-order filter signal V02. The comparison circuit 403 subtracts the second-order filter signal V02 from the first-order filter signal V01 to output full-cycle current information of the inductor current. The full-cycle current information comprises the current information corresponding to the high-side switch T1 in the positive half cycle and the current information corresponding to the low-side switch T2 in the negative half cycle.

The current source 404 is coupled to the comparison circuits 403 and the compensation circuit 120B to generate a driving current signal according to the received driving voltage signal, and the generated driving current signal is used as the driving feedback signal Isen. The driving feedback signal Isen is similar to an alternating current (AC) signal of the current of the inductor L1, such as the driving feedback signal Isen may have a slope similar or identical to that of the current of the inductor L1.

For example, in the positive half cycle of the pulse width modulation signal Vdt, the high-side switch T1 is turned on and the low-side switch T2 is turned off, and then the input voltage Vin charges the inductor L1 and the capacitor C1 through the high-side switch T1. At this time, the phase node voltage Vx is not equal to zero, and the pulse output by the comparison circuit 403 is of a sawtooth shape.

On the other hand, in the negative half cycle of the pulse width modulation signal Vdt, the high-side switch T1 is turned off and the low-side switch T2 is turned on, and then the energy stored in the inductor L1 is released through the low-side switch T2. According to the characteristics of inductor Volt-Second balance mentioned earlier, the current of the low-side switch T2 flows from the ground terminal to the phase node N, and, thus, the phase node voltage Vx will be negative. As shown in FIG. 2C, the change in the voltage level of the phase node voltage Vx changes the output of the comparison circuit 403, thereby adjusting the driving current signal output by the current source 404.

As mentioned in previous embodiments, the power converters 100/100'/400/400' controller 200 and the power generates the control-compensation signal Vcomps (e.g., a full-cycle signal or half-cycle signal of the output current of the power converter) by using the error signal Vcomp (which is generated according to the difference between the voltage reference signal Vref and the voltage feedback signal Vfb) and the ramp signal Vramp (e.g., full-cycle sawtooth wave) and further receiving the driving feedback signal Isen through the negative feedback loop. Therefore, the bandwidth and transient response of the power converter 100 can be improved, and the output capacitor C1 can be prevented from being overcharged, thereby achieving the advantages of stable power supply, fixed-frequency control, quick response, etc.

Figure 3A:
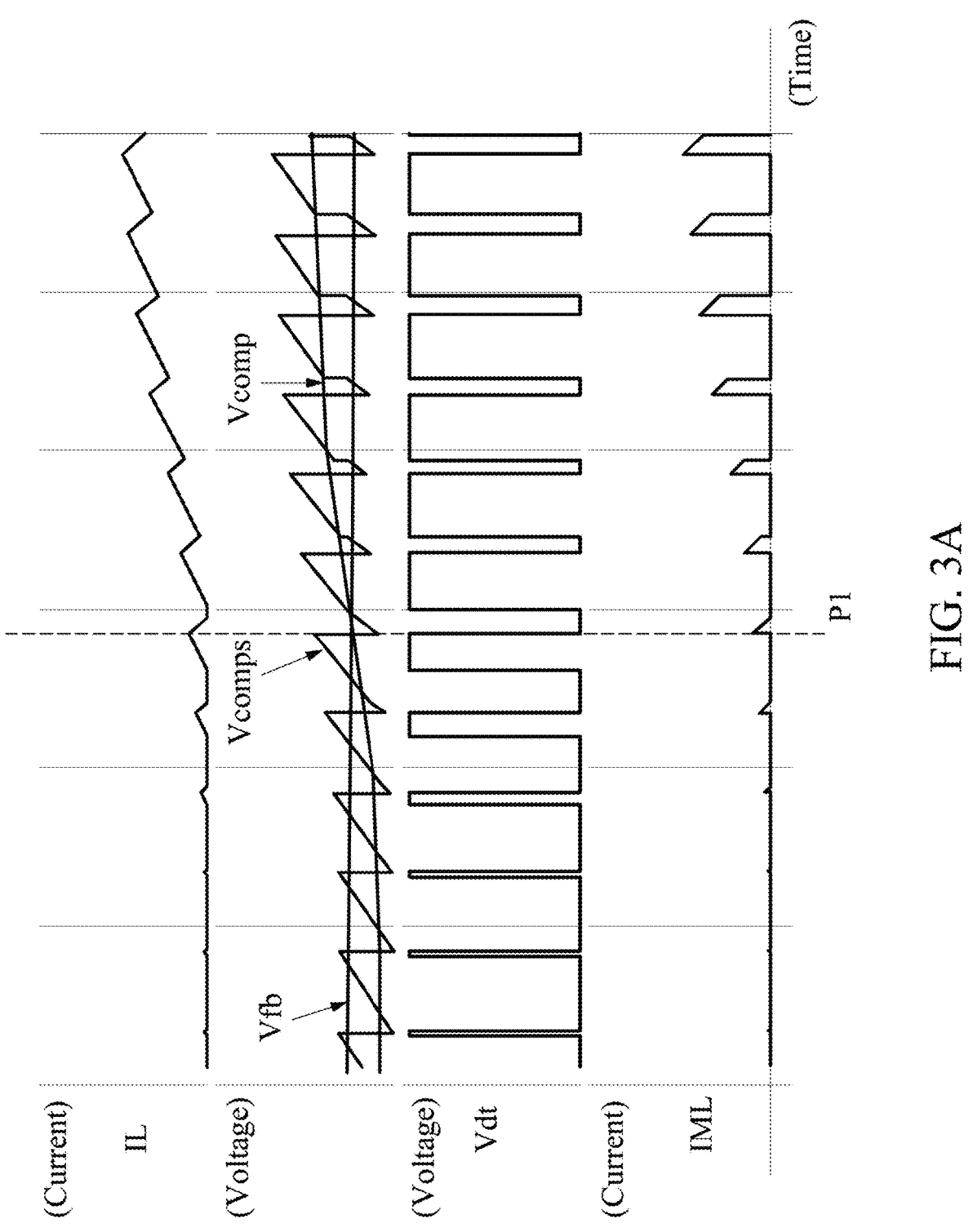
FIGS. 3A-3C are schematic diagrams showing changes in signals of the power converter in different states according to some embodiments of the present disclosure.

Referring to both FIG. 1A and FIG. 3A, FIG. 3A is a schematic diagram showing the transient response of the signals of the power converter 100 during slow increase of load according to some embodiments of the present disclosure. FIG. 3A includes, from top to bottom, a waveform diagram of the current IL (i.e., the current flowing through the inductor L1), a waveform diagram of the control-compensation signal/error signal/voltage feedback signal (Vcomps/Vcomp/Vfb), a waveform diagram of the pulse width modulation signal Vdt, and a waveform diagram of the low-side current IML (i.e., the detected current flowing through the low-side switch T2).

In a process wherein the load of the power converter 100 gradually changes from a light load to a heavy load, the error signal Vcomp and the control-compensation signal Vcomps rise gradually along with the increase of the current IL (i.e., the inductor current). Each time the control-compensation signal Vcomps is greater than the voltage feedback signal Vfb (which indicates insufficient load and the need for longer turned-on time of the high-side switch T1), the pulse width modulation signal Vdt responds promptly and switches to a high level, thereby achieving a timely transient response. If the transient response is realized simply according to the comparison between the error signal Vcomp and the voltage feedback signal Vfb, it can be seen from FIG. 3A that the error signal Vcomp does not exceed the voltage feedback signal Vfb until the time point P1, that is, the pulse width modulation signal Vdt switches to the high level at the time point P1.

Figure 3B:
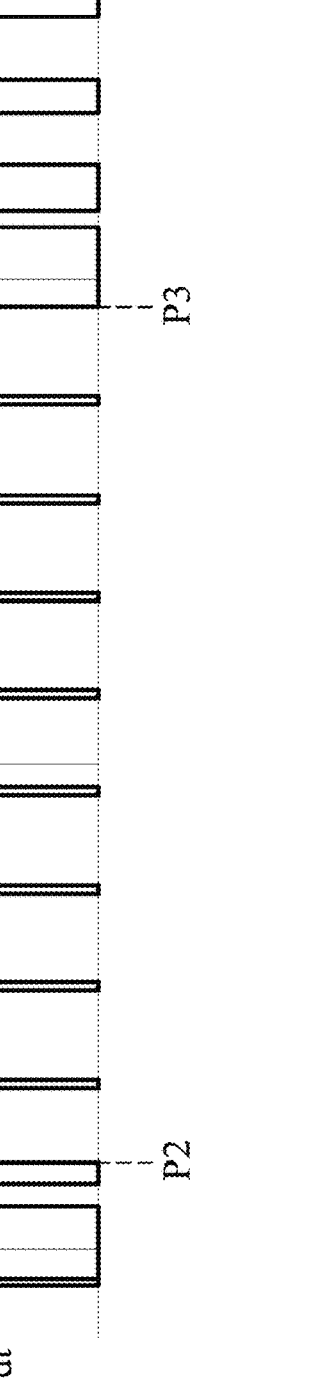

Referring to both FIG. 1A and FIG. 3B, FIG. 3B is a schematic diagram showing the transient response of the signals of the power converter 100 when the load increases rapidly to a heavy load according to some embodiments of the present disclosure. FIG. 3B includes, from top to bottom, a waveform diagram of the current IL (the current flowing through the inductor L1), a waveform diagram of the control-compensation signal/error signal/voltage feedback signal (Vcomps/Vcomp/Vfb), a waveform diagram of the pulse width modulation signal Vdt, and a waveform diagram of the low-side current IML (i.e., the detected current flowing through the low-side switch T2).

In a process where the load of the power converter 100 rapidly changes from a light load to a heavy load, the error signal Vcomp and the control-compensation signal Vcomps will rise gradually along with the increase of the current IL (i.e., the inductor current). Each time the control-compensation signal Vcomps is greater than the voltage feedback signal Vfb (which indicates insufficient load and the need for longer turned-on time of the high-side switch T1), the pulse width modulation signal Vdt responds promptly and switches to a high level, thereby providing timely transient response. In addition, through rapid pull-down of the control-compensation signal Vcomps in each cycle, the minimum turned-off time of the high-side switch T1 can be realized for the heavy load of the circuit (referring to the period from the time point P2 to the time point P3). Moreover, when the circuit is switched to a light load at the time point P3, the control-compensation signal Vcomps is pulled down quickly to below the voltage feedback signal Vfb, so that the pulse width modulation signal Vdt immediately switches to a low level. According to the above comparison, in comparison to the approach of performing compensation simply according to the error signal Vcomp and the voltage feedback signal Vfb, the approach of the present disclosure realizes notably better transient response.

Figure 3C:
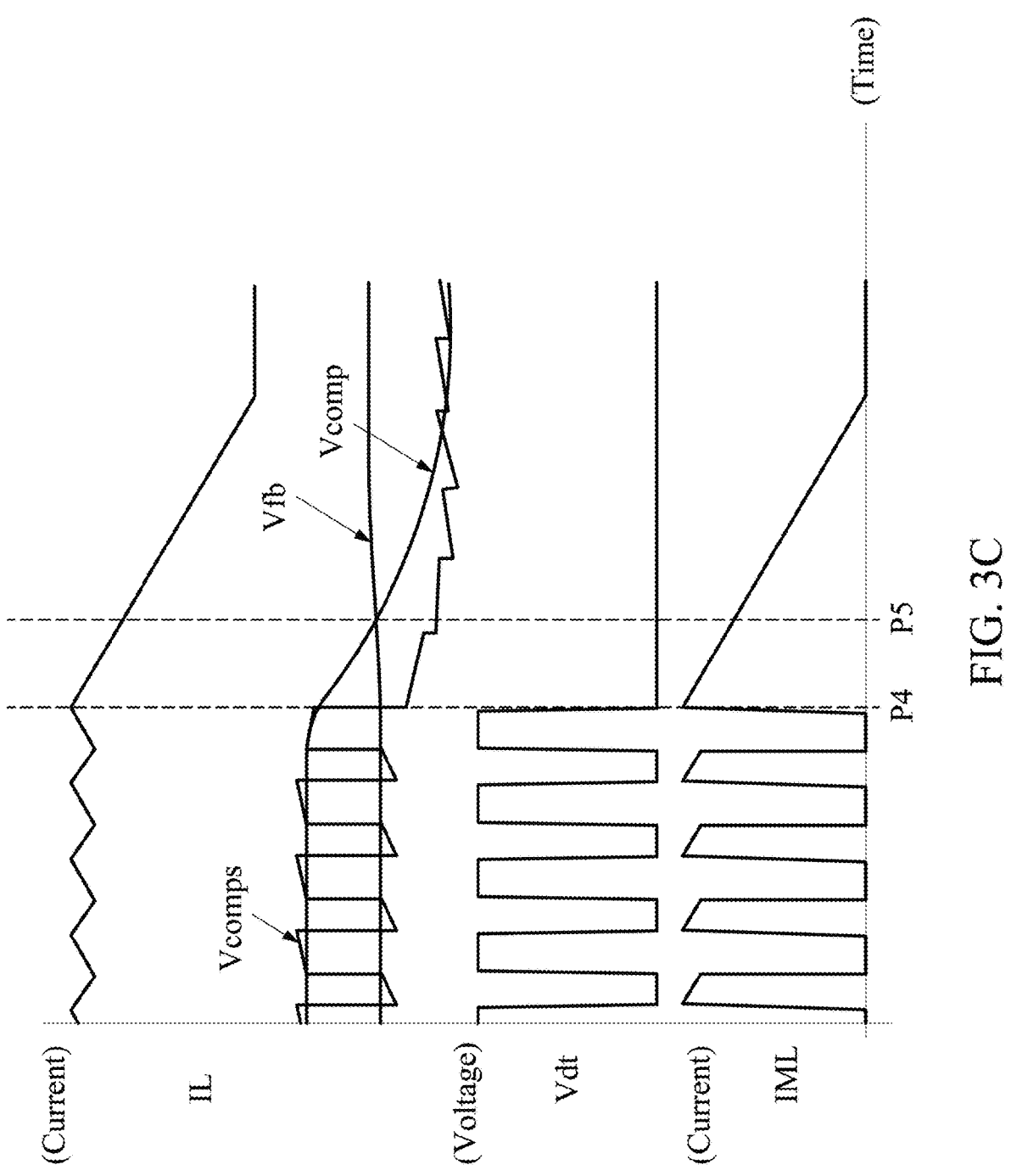

Referring to both FIG. 1A and FIG. 3C, FIG. 3C is a schematic diagram showing the transient response of the signals of the power converter 100 for quick unloading according to some embodiments of the present disclosure. FIG. 3C includes, from top to bottom, a waveform diagram of the current IL (the current flowing through the inductor L1), a waveform diagram of the control-compensation signal/error signal/voltage feedback signal (Vcomps/Vcomp/Vfb), a waveform diagram of the pulse width modulation signal Vdt, and a waveform diagram of the low-side current IML (i.e., the detected current flowing through the low-side switch T2). In a process wherein quick unloading of power converter 100, the solution of the present disclosure can pull down the control-compensation signal Vcomps to below the voltage feedback signal Vfb at a time point P4, and the pulse width modulation signal Vdt will respond promptly and switch to a low level, thereby providing timely transient response. If the transient response is conducted simply according to the comparison between the error signal Vcomp and the voltage feedback signal Vfb, the pulse width modulation signal Vdt will not switch to the low level until the time point P5. It can be seen from the above that the technical solution of the present disclosure realizes notably better transient response.

According to in the embodiments of the present application, the speed of the transient response exhibited by the power converter is determined according to the current load condition, such as the heavy or light load, thereby achieving charge balance between the charging and the discharging of the capacitor C1. Thus, overshoot and undershoot events on the output voltage Vout, which may be caused by over-charging and over-discharging on the capacitor C1, can be prevented.

The elements, steps or technical characteristics in the above-mentioned embodiments can be combined with each other, and are not limited to the order of text description or drawing presentation in the present disclosure.

Although the present disclosure has been disclosed above in embodiments, the embodiments are not intended to limit the present disclosure, and those skilled in the art may make various changes and embellishments without departing from the spirit and scope of the present disclosure. Therefore, the scope of protection of the present disclosure shall be defined in the attached claims.

What is claimed is:

1. A power controller, applied to a power converter, wherein the power converter comprises the power controller, a power output circuit and an energy storage circuit, the power output circuit is coupled between the power controller and the energy storage circuit and configured to convert an input voltage to an output voltage, and the power controller comprises:

a compensation circuit, coupled to the power output circuit and configured to receive a ramp signal, a voltage feedback signal and a driving feedback signal of the power output circuit to generate a control-compensation signal, wherein the voltage feedback signal is generated according to the output voltage, and the driving feedback signal is associated with a phase node voltage at a phase node in the power output circuit; and a control circuit, coupled between the compensation circuit and the power output circuit and configured to compare the voltage feedback signal with the control-compensation signal to generate a comparison signal, wherein the control circuit is further configured to output a pulse width modulation signal to the power output circuit according to the comparison signal and a clock signal, wherein the pulse width modulation signal has a duty cycle, and the control circuit is further configured to set the duty cycle according to the comparison signal and reset the duty cycle according to the clock signal.

2. The power controller of claim 1, wherein the ramp signal has a fixed slope.

3. The power controller of claim 1, wherein the compensation circuit further generates the control-compensation signal according to an error signal, and the error signal is generated according to the voltage feedback signal.

4. The power controller of claim 3, wherein the compensation circuit comprises:

an error detection circuit, configured to generate the error signal according to the voltage feedback signal and a voltage reference signal; and an operational circuit, coupled to the error detection circuit and configured to generate the control-compensation signal according to the error signal, the ramp signal and the driving feedback signal.

5. The power controller of claim 1, wherein the power output circuit comprises a driving circuit, a high-side switch and a low-side switch, the energy storage circuit comprises an inductor, the high-side switch and the low-side switch are coupled to the control circuit, the phase node is coupled between the high-side switch and the low-side switch, one terminal of the inductor is coupled to the phase node, and the power output circuit is configured to alternately turn on the high-side switch and the low-side switch to output the output voltage at the other terminal of the inductor.

6. The power controller of claim 5, further comprising:

a feedback circuit, coupled between the phase node of the power output circuit and the compensation circuit and configured to generate a driving current signal according to the phase node voltage as the driving feedback signal.

7. The power controller of claim 6, wherein the feedback circuit comprises:

a comparison circuit, configured to generate a driving voltage signal according to the phase node voltage and a ground voltage; and a current source, coupled to the comparison circuit and configured to generate the driving current signal according to the driving voltage signal.

8. The power controller of claim 6, wherein the feedback circuit comprises:

a filter circuit, configured to generate a plurality of filter signals according to the phase node voltage; and a comparison circuit, coupled to the filter circuit and configured to generate a driving voltage signal according to the filter signals, wherein the driving voltage signal is provided to generate the driving feedback signal.

9. The power controller of claim 8, wherein the filter circuit is a second-order filter and is configured to generate a first-order filter signal and a second-order filter signal according to the phase node voltage, and the comparison circuit is configured to compare the first-order filter signal with the second-order filter signal to generate the driving voltage signal.

10. The power controller of claim 1, wherein the control circuit comprises:

a signal comparator, having a first input terminal and a second input terminal, wherein the first input terminal is configured to receive the control-compensation signal, and the second input terminal is configured to receive the voltage feedback signal to generate the comparison signal; and a signal register, coupled to the signal comparator and the power output circuit and configured to receive the comparison signal to output the pulse width modulation signal.

11. A power converter, comprising:

a power output circuit, comprising a high-side switch, a low-side switch and a driving circuit, and configured to convert an input voltage to an output voltage;

an energy storage circuit, coupled to the power output circuit and configured to receive the output voltage;

a compensation circuit, coupled to the power output circuit and configured to receive a ramp signal, a voltage feedback signal and a driving feedback signal of the power output circuit to generate a control-compensation signal, wherein the voltage feedback signal is generated according to the output voltage, and the driving feedback signal is associated with a phase node voltage at a phase node in the power output circuit; and a control circuit, coupled between the compensation circuit and the power output circuit and configured to compare the voltage feedback signal with the control-compensation signal to generate a comparison signal, wherein the control circuit is further configured to output a pulse width modulation signal to the power output circuit according to the comparison signal and a clock signal, wherein the pulse width modulation signal has a duty cycle, and the control circuit is further configured to set the duty cycle according to the comparison signal and reset the duty cycle according to the clock signal.

12. The power converter of claim 11, wherein the ramp signal has a fixed slope.

13. The power converter of claim 11, wherein the compensation circuit further generates the control-compensation signal according to an error signal, and the error signal is generated according to the voltage feedback signal.

14. The power converter of claim 13, wherein the compensation circuit comprises:

an error detection circuit, configured to generate the error signal according to the voltage feedback signal and a voltage reference signal; and an operational circuit, coupled to the error detection circuit and configured to generate the control-compensation signal according to the error signal, the ramp signal and the driving feedback signal.

15. The power converter of claim 11, wherein the energy storage circuit comprises an inductor, the high-side switch and the low-side switch are coupled to the control circuit, the phase node is coupled between the high-side switch and the low-side switch, one terminal of the inductor is coupled to the phase node, and the power output circuit is configured to alternately turn on the high-side switch and the low-side switch to output the output voltage at the other terminal of the inductor.

16. The power converter of claim 15, further comprising:

a feedback circuit, coupled between the phase node of the power output circuit and the compensation circuit and configured to generate a driving current signal according to the phase node voltage, as the driving feedback signal.

17. The power converter of claim 16, wherein the feedback circuit comprises:

a comparison circuit, configured to generate a driving voltage signal according to the phase node voltage and a ground voltage; and a current source, coupled to the comparison circuit and configured to generate the driving current signal according to the driving voltage signal.

18. The power converter of claim 16, wherein the feedback circuit comprises:

a filter circuit, configured to generate a plurality of filter signals according to the phase node voltage; and a comparison circuit, coupled to the filter circuit and configured to generate a driving voltage signal according to the filter signals, wherein the driving voltage signal is provided to generate the driving feedback signal.

19. The power converter of claim 18, wherein the filter circuit is a second-order filter and is configured to generate a first-order filter signal and a second-order filter signal according to the phase node voltage, and the comparison circuit is configured to compare the first-order filter signal with the second-order filter signal to generate the driving voltage signal.

20. The power converter of claim 11, wherein the control circuit comprises:

a signal comparator, having a first input terminal and a second input terminal, wherein the first input terminal is configured to receive the control-compensation signal, and the second input terminal is configured to receive the voltage feedback signal to generate the comparison signal; and a signal register, coupled to the signal comparator and the power output circuit and configured to receive the comparison signal to output the pulse width modulation signal.

* * * * *